United States Patent
Choi

(10) Patent No.: US 8,907,773 B2
(45) Date of Patent: Dec. 9, 2014

(54) IMAGE PROCESSING FOR IMAGE DISPLAY APPARATUS MOUNTED TO VEHICLE

(75) Inventor: Sungha Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 550 days.

(21) Appl. No.: 13/218,384

(22) Filed: Aug. 25, 2011

(65) Prior Publication Data

US 2012/0242473 A1    Sep. 27, 2012

Related U.S. Application Data

(60) Provisional application No. 61/467,819, filed on Mar. 25, 2011.

(51) Int. Cl.
- *B60Q 1/00* (2006.01)
- *G01C 21/36* (2006.01)
- *B60W 50/14* (2012.01)

(52) U.S. Cl.
CPC ...... *G01C 21/3688* (2013.01); *B60W 2050/146* (2013.01); *B60K 2350/1076* (2013.01); *B60W 50/14* (2013.01); *B60W 2050/143* (2013.01); *B60K 2350/1096* (2013.01); *B60W 2520/10* (2013.01)
USPC ............ 340/441; 340/425.5; 340/426.16; 340/426.17; 340/438; 340/447

(58) Field of Classification Search
USPC ........... 340/441, 425, 425.5, 426.17, 426.16, 340/438, 439, 447
See application file for complete search history.

(56) References Cited

U.S. PATENT DOCUMENTS

| | | | |
|---|---|---|---|
| 5,850,629 A | | 12/1998 | Holm et al. |
| 6,154,658 A | * | 11/2000 | Caci ............................. 455/466 |
| 2003/0095688 A1 | * | 5/2003 | Kirmuss ....................... 382/105 |
| 2010/0057465 A1 | | 3/2010 | Kirsch et al. |

FOREIGN PATENT DOCUMENTS

| | | |
|---|---|---|
| JP | 10-91389 A | 4/1998 |
| JP | 2010-61137 A | 3/2010 |
| JP | 2011-507078 A | 3/2011 |
| KR | 10-0674809 B1 | 1/2007 |
| KR | 10-0832805 B1 | 5/2008 |
| KR | 10-2009-0028789 A | 3/2009 |
| KR | 10-2010-0070092 A | 6/2010 |

* cited by examiner

*Primary Examiner* — Daryl Pope
(74) *Attorney, Agent, or Firm* — Birch, Stewart, Kolasch & Birch, LLP

(57) ABSTRACT

An image display apparatus capable of allowing a user to stably and conveniently check an image provided from a mobile terminal while driving a vehicle, by extracting a text corresponding to a screen image provided from the mobile terminal, by converting the extracted text into an audio signal according to a vehicle speed, and then by outputting the audio signal. The image display apparatus mounted to a vehicle includes a communication unit configured to receive an image from a mobile terminal, a display unit configured to display the received image, a controller configured to acquire a text corresponding to the displayed image, to acquire a vehicle speed, and to convert the acquired text into an audio signal when the speed exceeds a threshold speed, and an audio output unit configured to output the audio signal.

20 Claims, 17 Drawing Sheets

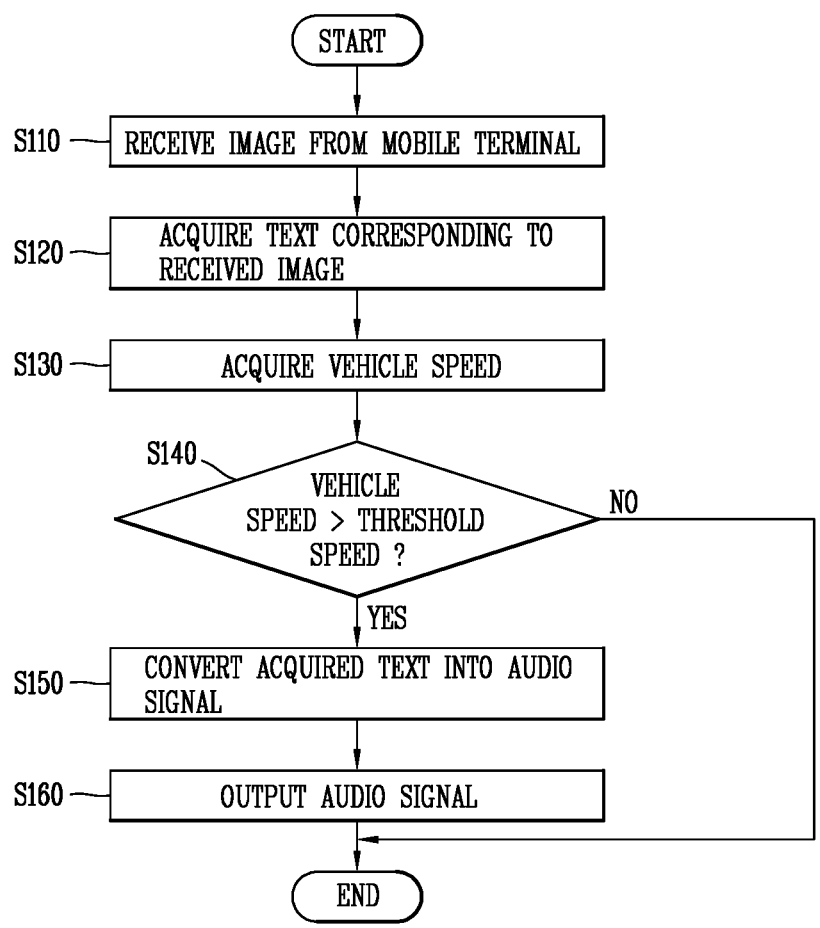

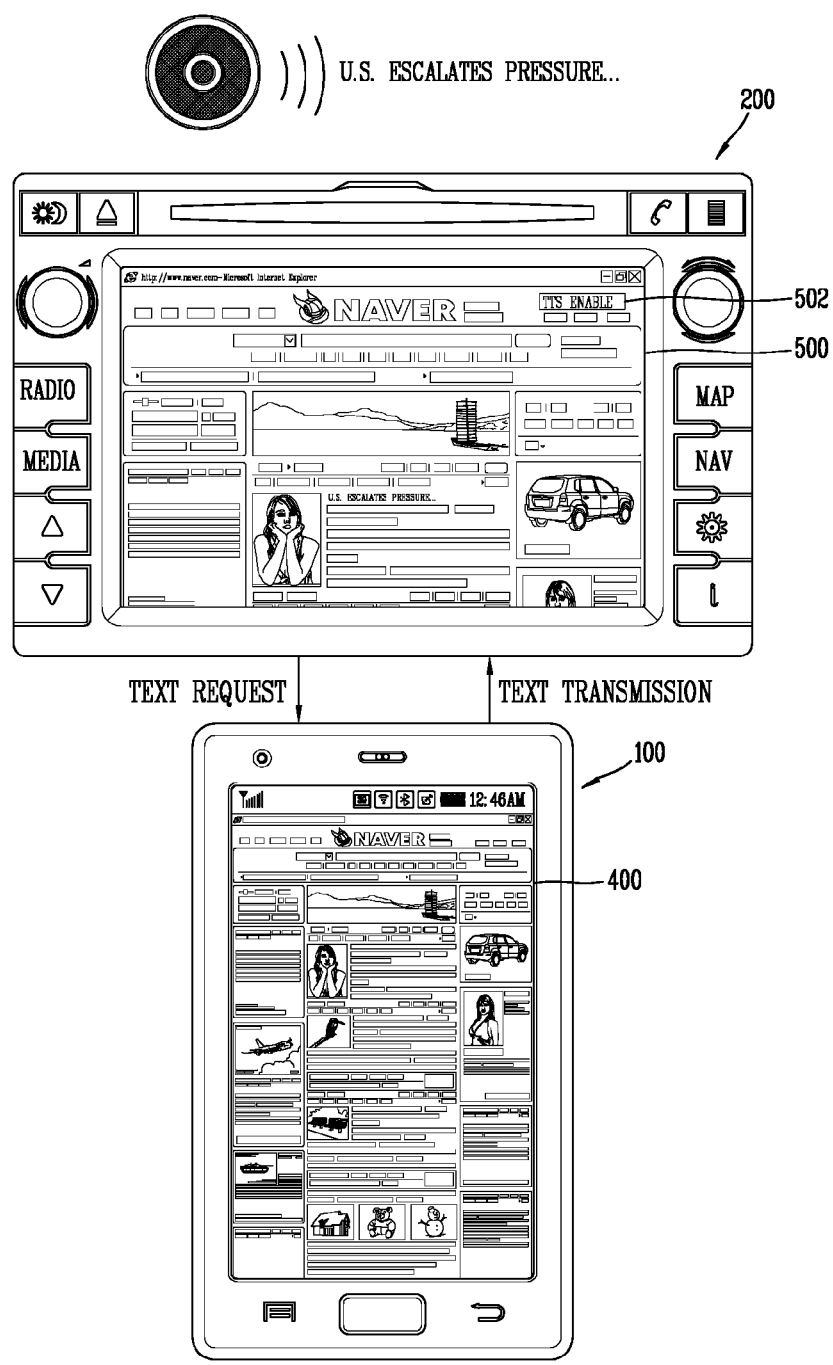

IMAGE PROCESSING FOR IMAGE DISPLAY APPARATUS MOUNTED TO VEHICLE

CROSS-REFERENCE TO RELATED APPLICATION

This application claims the benefit of U.S. Provisional Application No. 61/467,819, filed on Mar. 25, 2011, which is hereby incorporated by reference for all purposes as if fully set forth herein.

BACKGROUND OF THE INVENTION

1. Field of the Invention

This specification relates to an electronic apparatus, and particularly, to an image processing method for an image display apparatus mounted to a vehicle, an image display apparatus and a corresponding mobile terminal.

2. Background of the Invention

An image display apparatus is an apparatus having a function to output images viewable by a user. A user may view images in a vehicle through an image display apparatus mounted to a vehicle. The image display apparatus mounted to a vehicle may receive images viewable by a user, in a wired or wireless manner, through an external device inside the vehicle such as a mobile terminal.

SUMMARY OF THE INVENTION

Therefore, an aspect of the detailed description is to provide an image display apparatus capable of allowing a user to stably and conveniently check an image provided from a mobile terminal while driving a vehicle, by extracting a text corresponding to a screen image provided from the mobile terminal, by converting the extracted text into an audio signal according to a vehicle speed, and then by outputting the audio signal.

Another aspect of the detailed description is to provide a mobile terminal capable of allowing a user to stably and conveniently check an image provided therefrom while driving a vehicle, through an image display apparatus mounted to a vehicle, by extracting a text corresponding to a screen image, by converting the extracted text into an audio signal according to a vehicle speed, and then by outputting the audio signal together with the screen image.

To achieve these and other advantages and in accordance with the purpose of this specification, as embodied and broadly described herein, there is provided an image display apparatus mounted to a vehicle, the image display apparatus, comprising: a communication unit configured to receive an image from a mobile terminal; a display unit configured to display the received image; a controller configured to acquire a text corresponding to the displayed image, to acquire a vehicle speed, and to convert the acquired text into an audio signal when the speed exceeds a threshold speed; and an audio output unit configured to output the audio signal.

The communication unit may be configured to request a text corresponding to the displayed image from the mobile terminal, and to receive the requested text.

The communication unit may be configured to receive a message indicating that the displayed image is a text-based image from the mobile terminal, and may be configured to request a text corresponding to the displayed image from the mobile terminal when the message has been received.

The display unit may be configured to display an indicator indicating that a text corresponding to the displayed image can be output in the form of an audio signal when the speed exceeds a threshold speed.

The controller may execute an optical character recognition function with respect to the displayed image, and extract a text corresponding to the displayed image.

The controller may be configured to select an audio output region from the displayed image, and to extract a text from the selected region.

The image display apparatus may further comprise an input unit configured to receive an input for selecting the audio output region from the displayed image.

The controller may be configured to detect a plurality of text regions from the displayed image, and to select a first region of the plurality of text regions as the audio output region.

The controller may be configured to select a second region different from the first region as the audio output region after selecting the first region of the plurality of text regions as the audio output region.

The controller may be configured to select the second region different from the first region among the plurality of text regions, as the audio output region, together with the first region.

The display unit may be configured to display the audio output region selected from the displayed image, in a distinguished manner from regions rather than the audio output region.

The image display apparatus may further comprise a microphone configured to receive an audio signal.

The controller may be configured to convert the received audio signal into a text, and may be configured to determine one or more objects corresponding to the text from the displayed image.

The communication unit may be configured to transmit, to the mobile terminal, a control signal with respect to the determined one or more objects.

The image display apparatus may further comprise an input unit configured to receive an input for selecting one of the determined one or more objects. The communication unit may be configured to transmit a control signal with respect to the selected object to the mobile terminal.

The image display apparatus may further comprise a speed sensor configured to calculate a vehicle speed, and a GPS module configured to acquire GPS information of the vehicle. The controller may be configured to acquire a vehicle speed from the speed sensor, or based on the GPS information.

To achieve these and other advantages and in accordance with the purpose of this specification, as embodied and broadly described herein, there is also provided a mobile terminal, comprising: a controller configured to acquire a text corresponding to a screen image, and to acquire a vehicle speed; and a communication unit configured to transmit the screen image to an image display apparatus mounted to the vehicle, and to transmit the acquired text to the image display apparatus together with the screen image when the speed exceeds a threshold speed.

The controller may be configured to acquire the text corresponding to the application when an application corresponding to the screen image is a text-based application.

The communication unit may be configured to transmit, to the image display apparatus, a message indicating that the image is a text-based image when an application corresponding to the screen image is a text-based application.

The controller may execute an optical character recognition function with respect to the screen image when an application corresponding to the screen image is not a text-based application, and extract a text from the screen image.

The communication unit may be configured to acquire GPS information of the mobile terminal, and the controller may be configured to acquire a vehicle speed based on the GPS information or from the image display apparatus.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 4 is a flowchart illustrating processes for controlling an operation of an image display apparatus according to a first embodiment of the present invention;

FIGS. 7A and 7B are exemplary views illustrating processes for controlling an operation of an image display apparatus according to a second embodiment of the present invention;

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, an image processing in an image display apparatus mounted to a vehicle according to the present invention will be explained in more detail with reference to the attached drawings. The suffixes attached to components, such as 'module' and 'unit or portion', are used for facilitation of the detailed description of the present invention. Therefore, the suffixes do not have different meanings from each other.

Image Transmitting System

Figure 1:
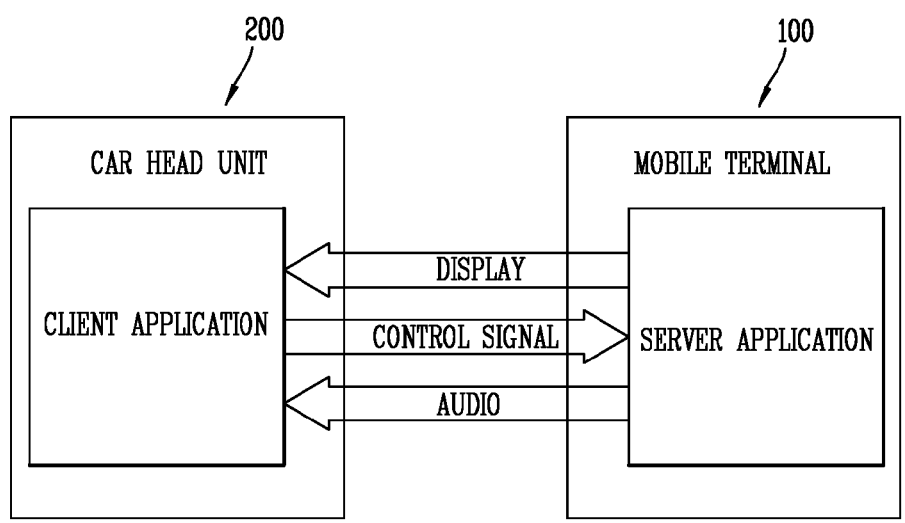
FIG. 1 is a view schematically illustrating an image transmitting system including a mobile terminal and an image display apparatus according to an embodiment of the present invention.

FIG. 1 is a view schematically illustrating an image transmitting system including a mobile terminal and an image display apparatus according to an embodiment of the present invention.

As shown in FIG. 1, an image transmitting system according to an embodiment of the present invention comprises a mobile terminal 100 and an image display apparatus 200.

The mobile terminal 100 may be connected to the image display apparatus 200 in a wired or wireless manner, and transmit at least one of a video signal and an audio signal to the image display apparatus 200.

The image display apparatus 200 is mounted to a vehicle in a fixed manner, and may be connected to the mobile terminal 100 in a wired or wireless manner to receive at least one of a video signal and an audio signal from the mobile terminal 100. And, the image display apparatus 200 may output at least one of a video signal and an audio signal received from the mobile terminal 100.

The image display apparatus 200 may receive an input from a user, and transmit the received input to the mobile terminal 100. For instance, once a user performs a touch input through a touch screen of the image display apparatus 200, the image display apparatus 200 may recognize a position where the touch input has been performed on a screen image, and may transmit information on the recognized position to the mobile terminal 100.

The mobile terminal 100 may determine the occurrence of a touch event at a position where the touch input has been performed, and may execute an operation corresponding to the generated touch event. That is, the user may control an operation of the mobile terminal 100 by using a touch screen, a hard key, etc. of the image display apparatus 200.

As one example of an image transmitting system, a user executes a road guiding application (or dialing, phonebook, e-mail, moving image play application, etc.) installed at the mobile terminal 100. Then, the mobile terminal 100 transmits an execution image of the road guiding application to the image display apparatus 200 so that the execution image of the road guiding application can be displayed on the image display apparatus 200.

The user may view the execution image of the road guiding application on a large screen of the image display apparatus 200, rather than on a small screen of the mobile terminal 100. And, the user may hear a road guiding sound through a speaker of the vehicle, rather than through a speaker of the mobile terminal 100.

Once the user selects a road guidance-related menu by using a touch screen or a hard key of the image display apparatus 200, the mobile terminal 100 may execute an operation corresponding to the menu. Then, the mobile terminal 100 may output an execution result with respect to the operation corresponding to the menu to the image display apparatus 200.

The mobile terminal 100 and the image display apparatus 200 may be connected to each other by using a short-range communication standard such as Bluetooth, a wireless internet standard such as Wi-Fi, an external device interface standard such as a universal serial bus (USB), and so on.

A server application for providing a service by a client' request may be installed at the mobile terminal 100, and a client application for accessing a service provided from a server may be installed at the image display apparatus 200.

The server application of the mobile terminal 100 is configured to capture a screen of the mobile terminal 100 regardless of an application type of the mobile terminal, and transmits the captured screen to the client application of the image display apparatus 200. And, the server application controls an operation of the mobile terminal 100 based on information received from the client application, the information on an event having occurred from the image display apparatus 200.

For instance, the image display apparatus 200 may remotely control the mobile terminal 100 in a virtual network computing (VNC) manner using a remote frame buffer (RFB) protocol which provides remote access with respect to graphical user interfaces. According to the VNC method, the mobile terminal 100 transmits a screen update to the image display apparatus 200 through a network, and transmits an event having occurred from the image display apparatus 200 to the mobile terminal 100.

And, the mobile terminal 100 may transmit an audio signal to the image display apparatus 200 or a headset or a hands-free, etc., according to an advanced audio distribution profile (A2DP) which defines a sound quality of an audio signal (stereo or mono) streamed to a second device from a first device through a Bluetooth connection, especially, a headset profile (HSP) relating to a Bluetooth headset, and a hands-free profile (HFP) applied to a hands-free for a vehicle, etc.

The mobile terminal 100 and the image display apparatus 200 may exchange additional information with each other based on additional protocols. For instance, the image display apparatus 200 may provide, to the mobile terminal 100, information on a vehicle status such as travel information, speed information and fuel information.

Applications installed at the mobile terminal 100 may be executed based on information on a vehicle status received from the image display apparatus 200 by using additional protocols. These applications may provide, to the image display apparatus 200, information about an application type (e.g., road guidance, multimedia, game, etc.), a graphic user interface (GUI) type (e.g., map, video, menu, etc.), and an application status (e.g., execution status in a foreground or a background).

Mobile Terminal

Figure 2:
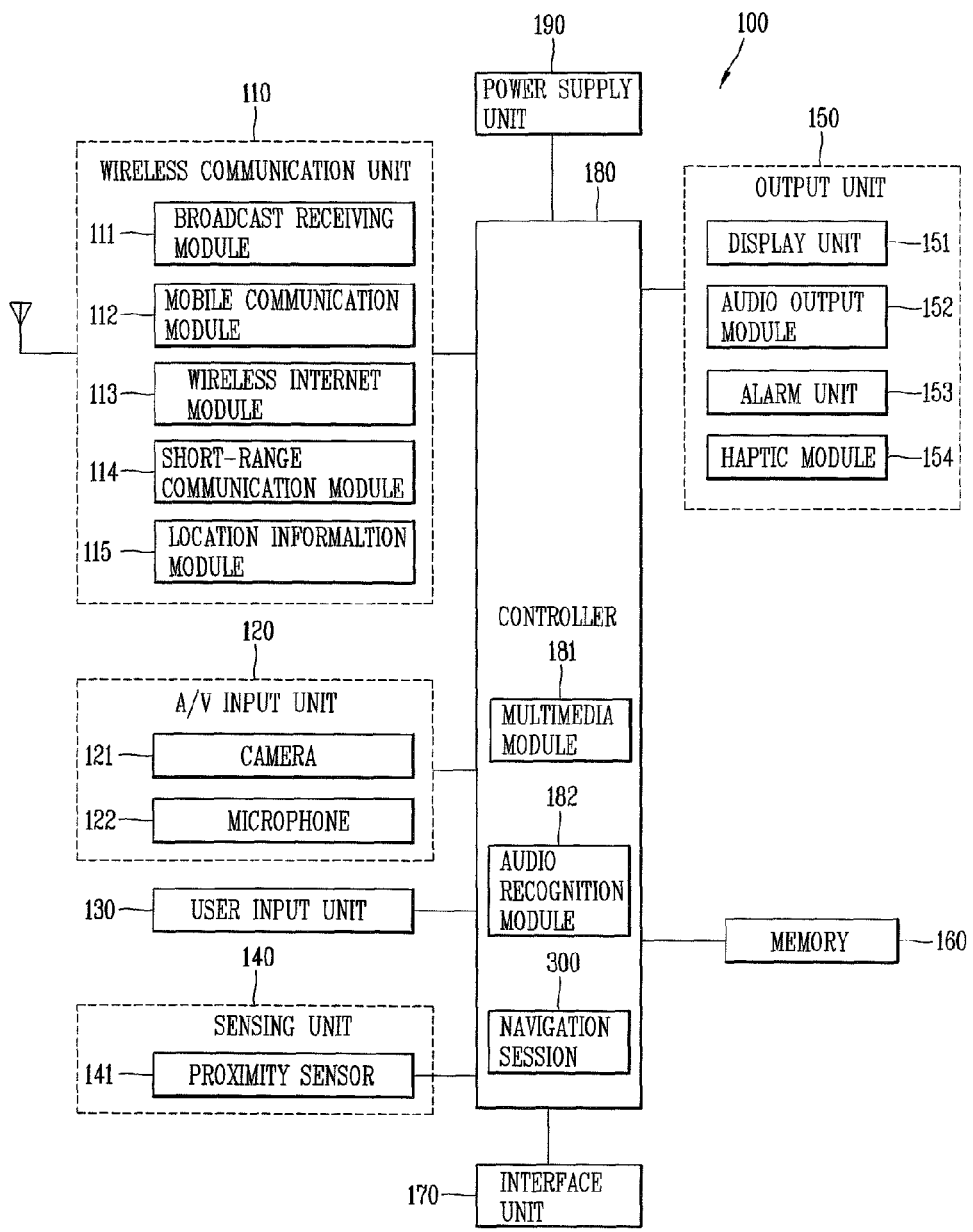
FIG. 2 is a block diagram illustrating a configuration of a mobile terminal 100 according to an embodiment of the present invention.

FIG. 2 is a block diagram illustrating a configuration of the mobile terminal 100 according to an embodiment of the present invention. The mobile terminal 100 may be configured in various manners. For instance, the mobile terminal 100 may be implemented as a portable phone, a smart phone, a notebook computer, a digital broadcasting terminal, personal digital assistants (PDA), a portable multimedia player (PMP), etc.

As shown in FIG. 2, the mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190. FIG. 2 illustrates the mobile terminal 100 having various components, but it is understood that implementing all of the illustrated components is not a requirement. The mobile terminal 100 may be implemented by greater or fewer components.

The wireless communication unit 110 includes one or more components allowing radio communication between the mobile terminal 100 and a wireless communication system or a network in which the mobile terminal is located. For example, the wireless communication unit 110 may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems. Broadcast signals and/or broadcast-associated information received via the broadcast receiving module 111 may be stored in the memory 160 (or another type of storage medium).

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet or other network access for the mobile communication terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile communication terminal. For example, the location information module 115 may include a GPS (Global Positioning System) module that receives location information from a plurality of satellites. Here, the location information may include coordinate information represented by latitude and longitude values. For example, the GPS module may measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. As the location information module 115, a Wi-Fi positioning system and/or a hybrid positioning system may be used.

The A/V input unit 120 is configured to receive an audio or video signal. The A/V input unit 120 may include a camera 121 and a microphone 122. The camera 121 processes image data of still pictures or video acquired by an image capture device in a video capturing mode or an image capturing mode. The processed image frames may be displayed on a display unit 151.

The image frames processed by the camera 121 may be stored in the memory 160 or transmitted via the wireless communication unit 110. Two or more cameras 121 may be provided according to the configuration of the mobile communication terminal.

The microphone 122 may receive sounds (audible data) via a microphone in a phone call mode, a recording mode, a voice recognition mode, and the like, and can process such sounds into audio data. The processed audio (e.g., voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid on the display unit 151 in a layered manner, it may form a touch screen.

The sensing unit 140 detects a current status (or state) of the mobile terminal 100 such as an opened or closed state of the mobile terminal 100, a location of the mobile terminal 100, the presence or absence of user contact with the mobile terminal 100 (e.g., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module 154, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like. The mobile terminal 100 may include two or more display units 151. For example, the mobile terminal may include both an external display unit (not shown) and an internal display unit (not shown).

When the display unit 151 and a sensor for sensing a touch operation (hereinafter, will be referred to as 'touch sensor') are overlaid in a layered manner to form a touch screen, the display unit 151 may function as both an input device and an output device. The touch sensor may be a touch film, a touch sheet, a touch pad, etc.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure. When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

The proximity sensor 141 may be arranged at an inner region of the mobile terminal 100 covered by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Accordingly, if the pointer is in proximity to the touch screen without contacting the touch screen, the position of the pointer and a distance between the pointer and the touch screen may be detected. Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses a proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the mobile terminal 100, e.g., sound alarming a call received or a message received, and so on. The audio output module 152 may include a receiver, a speaker, a buzzer, and so on.

The alarm unit 153 outputs signals notifying the occurrence of events from the mobile terminal 100. The events occurring from the mobile terminal 100 may include call received, message received, key signal input, touch input, and so on. The alarm unit 153 may output not only video or audio signals, but also other types of signals such as signals notifying the occurrence of events in a vibration manner. For instance, the alarm unit 153 may be configured to vibrate responsive to the mobile terminal receiving a call or message. As another example, when a key signal has been inputted, the alarm unit 153 may output vibration as a feedback of the key signal input. Through this vibration output, a user may recognize the occurrence of an event. In order to output a signal in a vibration manner, the mobile terminal may be mounted with a vibrator. Here, the video signal or audio signal may be outputted through the display unit 151 or the audio output module 152.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100. For example, the haptic module 154 may be provided to a steering wheel, a gearshift, a lever, a seat, and the like.

The memory 160 may store a program for the processing and control of the controller 180. Alternatively, the memory 160 may temporarily store input/output data (e.g., phonebook data, messages, still images, video and the like).

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 serves as an interface by which at least one external device may be connected with the mobile terminal 100. For example, the external devices may include wired or wireless headset ports, an external power supply (or battery charger) ports, wired or wireless data ports, memory card ports, ports for connecting a device having an identification module, audio input/output (I/O) ports, video I/O ports, earphone ports, or the like. Here, the identification module may be a memory chip that stores various information for authenticating a user's authority for using the mobile terminal 100 and may include a user identity module (UIM), a subscriber identity module (SIM) a universal subscriber identity module (USIM), and the like. In addition, the device having the identification module (referred to as the 'identifying device', hereinafter) may take the form of a smart card. Accordingly, the identifying device may be connected with the terminal 100 via a port or other connection mechanisms. The interface unit 170 may be used to receive inputs (e.g., data, information, power, etc.) from an external device and transfer the received inputs to one or more elements within the mobile terminal 100 or may be used to transfer data between the mobile terminal and an external device.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 serves to supply power to each component by receiving external power or internal power under control of the controller 180.

Processes described herein may be implemented in a computer-readable or its similar medium using, for example, software, hardware, or any combination thereof.

For hardware implementation, the processes may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units designed to perform the functions described herein. In some cases, such processes may be implemented by the controller 180.

For software implementation, the processes, such as procedures or functions, may be implemented together with separate software modules that allow performing of at least one function or operation. Software codes can be implemented by a software application (or program) written in any suitable programming language. The software codes may be stored in the memory 160 and executed by the controller 180.

An audio recognition module 182 is configured to recognize an audio signal generated from a user, and to execute a corresponding function according to the recognized audio signal.

Image Display Apparatus

Figure 3:
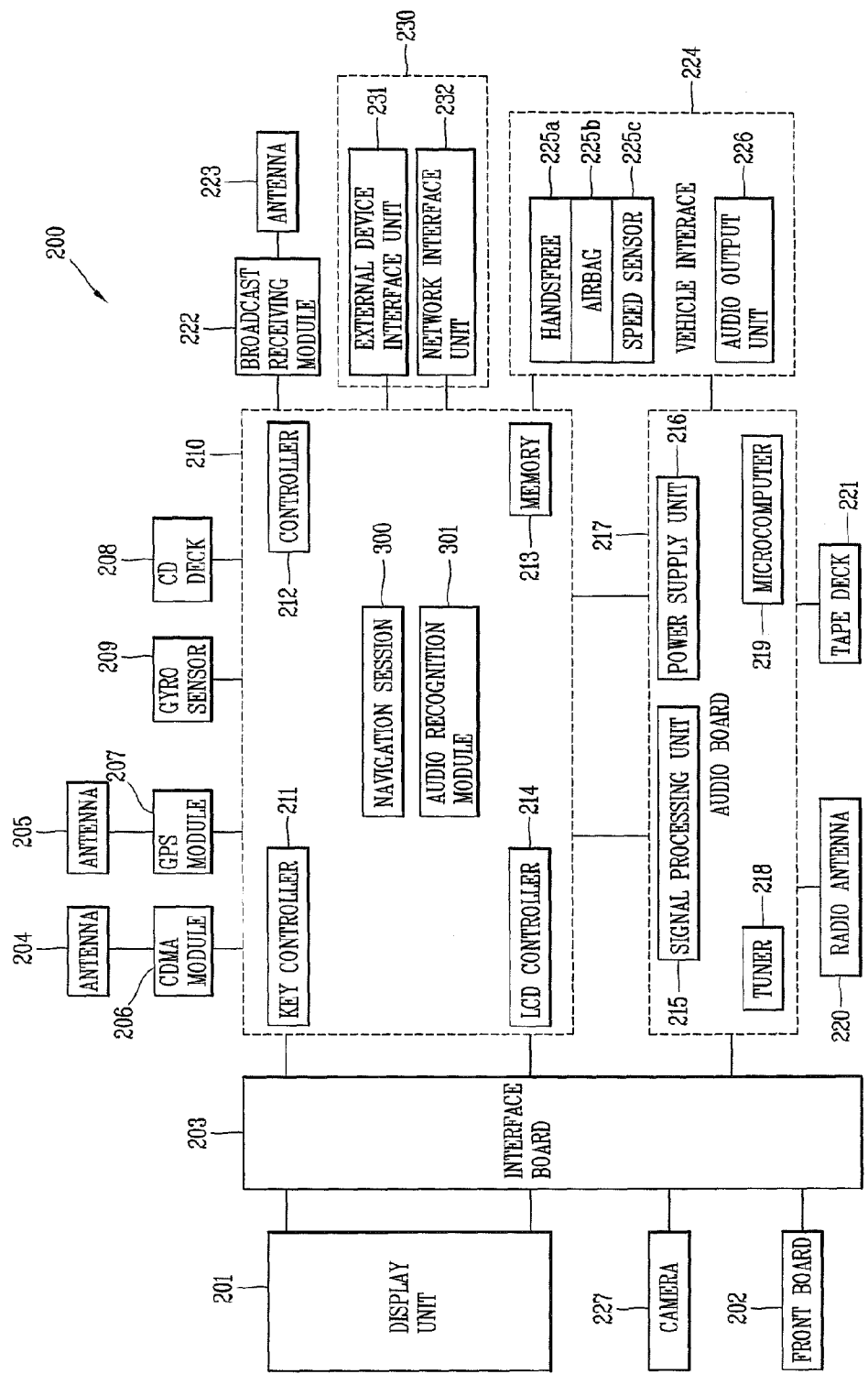
FIG. 3 is a block diagram illustrating a configuration of an image display apparatus 200 according to an embodiment of the present invention.

FIG. 3 is a block diagram illustrating a configuration of an image display apparatus 200 according an embodiment of to the present invention.

As shown in FIG. 3, the image display apparatus 200 comprises a main board 210 including a controller 212 configured to control an overall operation of the image display apparatus 200 (e.g., a central processing unit: CPU), a memory 213 configured to store therein programs for processing the controller 212 and input/output data, a key controller 211 configured to control key signals, and an LCD controller 214 configured to control a liquid crystal display (LCD).

The memory 213 may store therein map information (map data) for displaying road guidance information on a digital map. Also, the memory 213 may store therein a traffic information collection control algorithm for inputting traffic information according to a road condition in which a vehicle is currently traveling, and information for controlling the algorithm.

To the main board 210, may be connected a CDMA (code division multiple access) module 206 provided with a unique device number and mounted in a vehicle, a GPS module 207 configured to receive a GPS signal for guiding a position of a vehicle and tracking a travel path from a starting point to a destination point or to transmit traffic information collected by a user in the form of a global positioning system (GPS) signal, a CD deck 208 configured to play a signal recorded in a compact disk (CD), a gyro sensor 209, etc. The CDMA module 206 and the GPS module 207 may transmit or receive signals through antennas 204 and 205.

A broadcast signal receiving module 222 may be connected to the main board 210, and may receive a broadcast signal through an antenna 223. The main board 210 may be connected, through an interface board 203, to a display unit (LCD) 201 controlled by the LCD controller 214, a front board 202 controlled by the key controller 211, and a camera 227 configured to capture inside and/or outside of a vehicle. The display unit 201 is configured to display each kind of video signals and text signals. The front board 202 may be provided with buttons for inputting key signals, and supplies a key signal corresponding to a button selected by a user to the main board 210. And, the display unit 201 may include the proximity sensor and the touch sensor (touch screen) of FIG. 2.

The front board 202 may be provided with a menu key for directly inputting traffic information, and the menu key may be configured to be controlled by the key controller 211.

The audio board 217 is connected to the main board 210, and processes each kind of audio signals. The audio board 217 includes a micro computer 219 configured to control the audio board 217, a tuner 218 configured to receive a radio signal, a power unit 216 configured to supply power to the micro computer 219, and a signal processor 215 configured to process audio signals.

The audio board 217 may include a radio antenna 220 configured to receive a radio signal, and a tape deck 221 configured to play an audio tape. The audio board 217 may further include an audio output unit (e.g., an amplifier) 226 configured to output an audio signal processed by the audio board 217.

The audio output unit (e.g., an amplifier) 226 is connected to a vehicle interface 224. That is, the audio board 217 and the main board 210 are connected to the vehicle interface 224. To the vehicle interface 224, may be connected to a hands-free unit 225a for inputting an audio signal, an air bag 225b for a passenger's safety, a speed sensor 225c for detecting a vehicle speed, etc. The speed sensor 225c is configured to calculate a vehicle speed and to provide information on the calculated vehicle speed to the central processing unit 212.

The navigation session 300 applied to the image display apparatus 200 is configured to generate road guidance information based on map data and information on a current position of a vehicle, and to provide the generated road guidance information to a user.

The display unit 201 is configured to detect a proximity touch in a display window through a proximity sensor. For instance, when a pointer (e.g., a finger or a stylus pen) executes a proximity touch, the display unit 201 detects a position where the proximity touch has occurred and output position information corresponding to the detected position to the controller 212.

An audio recognition device (or audio recognition module) 301 is configured to recognize an audio signal (voice) generated from a user, and to perform a corresponding function according to the recognized audio signal.

The navigation session 300 applied to the image display apparatus 200 displays a travel path on map data. When the mobile terminal 100 is within a preset distance from a blind spot included in the travel path, the navigation session 300 automatically forms a wireless network with a terminal mounted to a peripheral vehicle (e.g., vehicle navigation system) and/or a mobile terminal held by a passerby through a wireless communication network (e.g., short-range wireless communication network). This may allow the navigation session 300 to receive position information of the peripheral vehicle from the terminal mounted to the peripheral vehicle, and to receive position information of the passerby from the mobile terminal held by the passerby.

The main board 210 may be connected to the interface unit 230, and the interface unit 230 may include an external device interface unit 231 and a network interface unit 232.

The external device interface unit 231 may connect an external device to the image display apparatus 200. For this, the external device interface unit 231 may include an A/V input/output unit (not shown) or a wireless communication unit (not shown).

The external device interface unit 231 may be connected to an external device in a wired or wireless manner, the external device such as a DVD (Digital Versatile Disk), a Blu ray, a game player, a camera, a camcorder and a notebook computer. The external device interface unit 231 transmits, to the controller 212, a video signal or an audio signal or a data signal input from the outside through the connected external device. And, the video signal or the audio signal or the data signal processed by the controller 212 may be output to the connected external device.

The A/V input/output unit may include a USB terminal, a CVBS (Composite Video Banking Sync) terminal, a component terminal, an S-video terminal (analogue), a DVI (Digital Visual Interface) terminal, an HDMI (High Definition Multimedia Interface) terminal, an RGB terminal and a D-SUB terminal, so that an audio signal and a video signal of an external device are input to the image display apparatus 200.

The wireless communication unit may perform a short-range wireless communication with other electronic device. For instance, the image display apparatus 200 may be connected to other electronic device through a network, according to a communication standard such as Bluetooth, RFID (Radio Frequency Identification), IrDA (infrared Data Association), UWB (Ultra Wideband), ZigBee and DLNA (Digital Living Network Alliance).

The external device interface unit 231 may be connected to various set-top boxes through one of the aforementioned terminals, thereby performing inputs and outputs with the set-top boxes.

The external device interface unit 231 may receive applications inside a neighboring external device or a list of applications, and transmit the received applications or list to the controller 212 or the memory 213.

The network interface unit 130 provides an interface for connecting the image display apparatus 100 to a wired/wireless network including an internet network. The network interface unit 130 may be provided with an Ethernet terminal for connection with a wired network, and may utilize communication standards such as WLAN (Wireless LAN)(Wi-Fi), Wibro (Wireless broadband), Wimax (World Interoperability for Microwave Access), and HSDPA (High Speed Downlink Packet Access) for connection with a wireless network.

The network interface unit 232 provides an interface for connecting the image display apparatus 200 to a wired or wireless network including an internet network. The network interface unit 232 may be provided with an Ethernet terminal for accessing a wired network, and may utilize a communication standard such as WLAN (Wireless LAN) (Wi-Fi), Wibro (Wireless broadband), Wimax (World Interoperability for Microwave Access) and HSDPA (High Speed Downlink Packet Access) for accessing a wireless network.

The network interface unit 232 may transmit or receive data to/from other user or other electronic device, through an accessed network or other network linked to an accessed network. Especially, the network interface unit 232 may transmit some of contents data stored in the image display apparatus 200, to a user or an electronic device selected from a plurality of users or electronic devices pre-registered in the image display apparatus 200.

The network interface unit 232 may access a predetermined web page through an accessed network or other network linked to an accessed network. More concretely, the network interface unit 232 may access a predetermined web page through a network thus to perform data transmission or data reception with a corresponding server. Also, the network interface unit 232 may receive contents or data provided from a contents provider or a network operator. More concretely, the network interface unit 232 may receive contents of a film, an advertisement, a game, a video on demand (VOD), a broadcasting signal, etc. provided from a contents provider or a network provider through a network, and information relating to the contents. The network interface unit 232 may receive update information and an update file of a firmware provided from a network operator. The network interface unit 232 may transmit data to an internet or contents provider or a network operator.

And, the network interface unit 232 may receive, through a network, a desired application by selecting from applications open to the public.

First Embodiment

FIG. 4 is a flowchart illustrating processes for controlling an operation of the image display apparatus according to a first embodiment of the present invention. The process of FIG. 4 may be performed by the devices of FIGS. 1-3.

The interface unit 230 may receive an image from the mobile terminal 100 connected to the external device interface unit 231 or the network interface unit 232 (S110). For instance, the interface unit 230 receives, from the mobile terminal 100, a frame buffer including values of all pixels to be displayed on a screen of the mobile terminal 100.

The image may be a screen image corresponding to a screen of the mobile terminal 100. For instance, the screen image may be a standby screen, or a locking screen of the mobile terminal 100, or an image corresponding to an application being executed in the mobile terminal 100.

The display unit 201 may display an image received from the mobile terminal 100 under control of the LCD controller 214. In this case, the controller 212 may resize the image received from the mobile terminal 100, and may control the LCD controller 214 such that the resized image is displayed on the display unit 201.

The controller 212 may acquire a text corresponding to an image received from the mobile terminal 100 (S120).

The controller 212 may execute an optical character recognition function to extract a text from the image received from the mobile terminal 100.

Alternatively, the controller 212 may request a text corresponding to the image received from the mobile terminal 100 from the mobile terminal 100, and may receive the requested text from the mobile terminal 100.

In this case, the mobile terminal 100 may perform an optical character recognition function to extract a text from the image received from the mobile terminal 100.

Alternatively, the mobile terminal 100 may determine whether an application corresponding to a requested image is a text-based application such as a web browser and an E-book. If it is determined that the application is a text-based application, a text may be acquired through the application. For instance, the controller 180 may acquire a text from data stored in the memory 160 at a region accessible by an application.

The controller 212 may acquire a vehicle speed (S130). For instance, the controller 212 may acquire a vehicle speed by calculating a vehicle speed by the speed sensor 225*c*, and then by transmitting information on the calculated vehicle speed to the controller 212.

Alternatively, the GPS module 207 may acquire position information of a vehicle, and the controller 212 may directly calculate a vehicle speed from position changes of the vehicle according to time based on the acquired position information of the vehicle.

The controller 212 compares the calculated vehicle speed with a threshold speed, and determines whether to enter a TTS (Text To Speech) mode based on a result of the comparison (S140). More concretely, when the calculated vehicle speed exceeds a threshold speed stored in the memory 213 (e.g., zero miles per hour, or a travel speed restricted by law such as 5 miles per hour), the controller 212 enters a TTS mode. On the other hand, when the calculated vehicle speed does not exceed the threshold speed stored in the memory 213, the controller 212 maintains a general mode.

Then, the controller 212 converts the acquired text into an audio signal (S150). The controller 212 may convert a text into an audio signal by using a TTS (Text To Speech) engine, etc. The audio output unit 226 outputs the audio signal (S160).

Figure 5A:
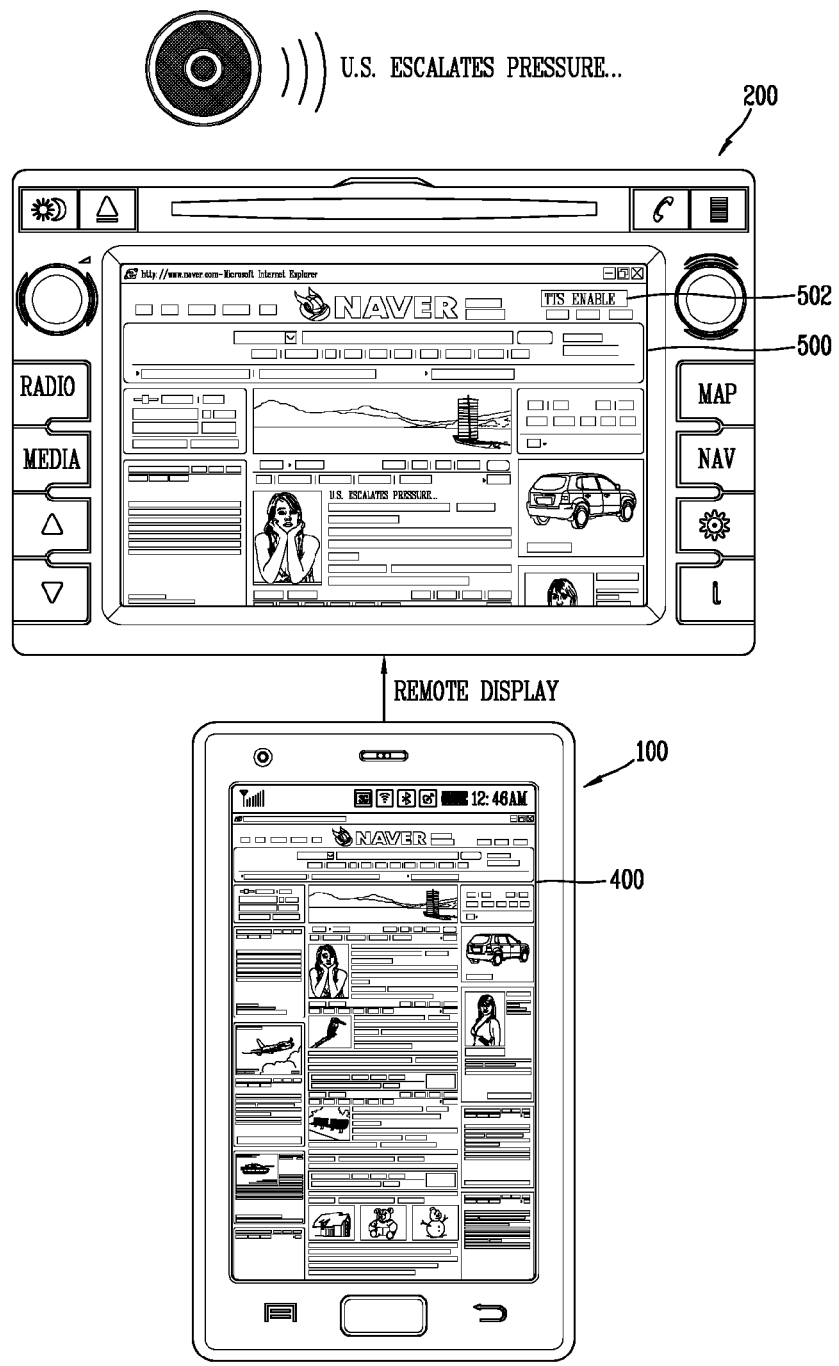
FIGS. 5A and 5B are exemplary views illustrating processes for controlling an operation of an image display apparatus according to the first embodiment of the present invention.
Figure 5B:
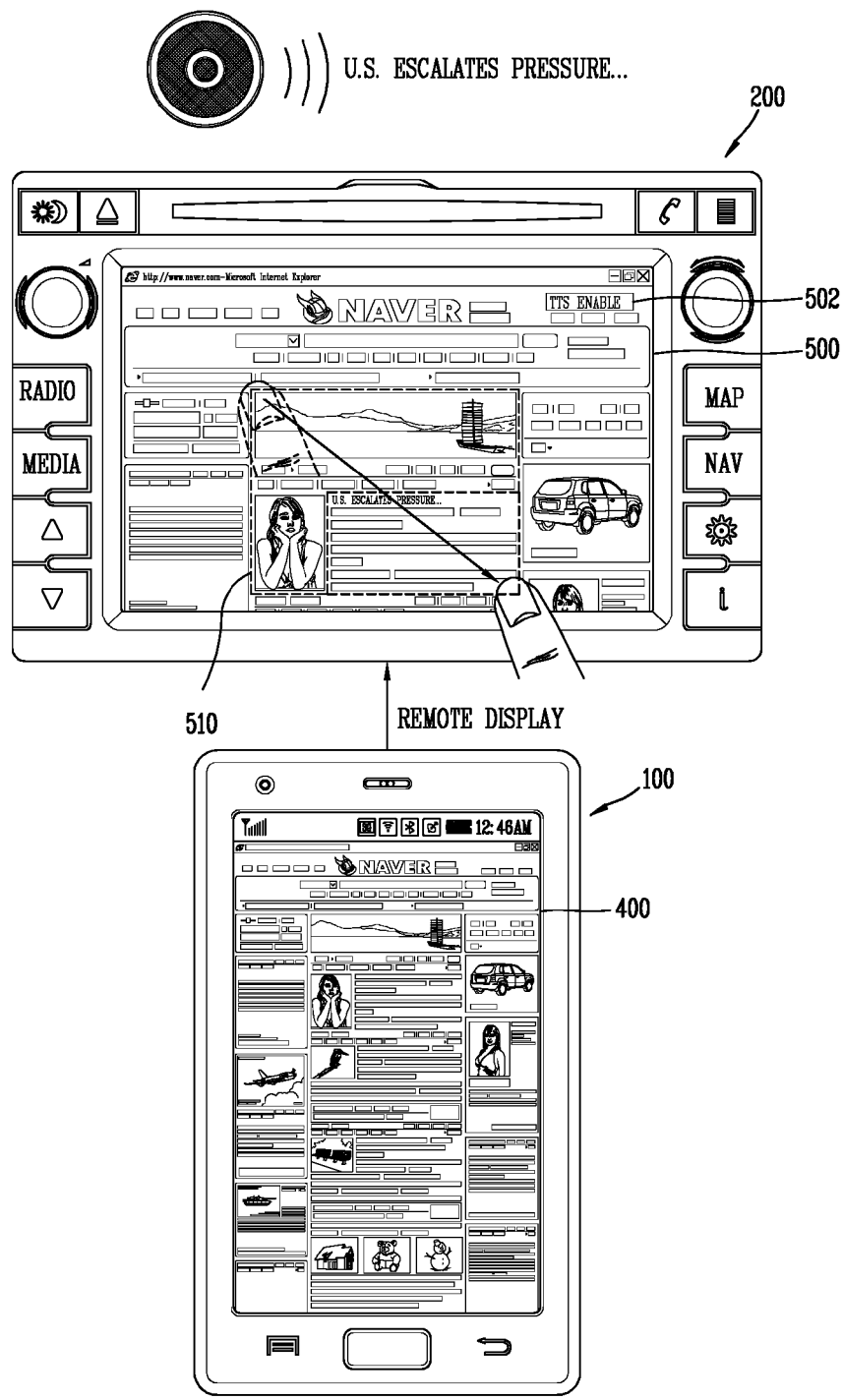

FIGS. 5A and 5B are exemplary views illustrating processes for controlling an operation of the image display apparatus according to the first embodiment of the present invention.

Referring to FIG. 5A, the interface unit 230 may receive a screen image from the mobile terminal 100. For instance, the interface unit 230 may receive a frame buffer corresponding to a screen image from the mobile terminal 100, and the display unit 201 may display pixels on a corresponding position on a screen according to the received frame buffer.

In this case, the mobile terminal 100 may display or may not display the screen image 400 on the screen thereof according to a configuration.

The display unit 201 may display a screen image 500 received from the mobile terminal 100 on a screen, and the controller 212 may execute an optical character recognition function with respect to the displayed screen image 500 thus to extract a text.

The controller 212 may determine a vehicle speed, and may compare the determined vehicle speed with a threshold speed. If the determined vehicle speed exceeds the threshold speed, the controller 212 may enter a TTS (Text To Speech) mode. In this case, the display unit 201 may display an indicator 502 indicating that the image display apparatus 200 is in a TTS mode.

Once the image display apparatus 200 has entered the TTS mode, the controller 212 may convert the extracted text into an audio signal by using a TTS (Text To Speech) engine, and output the audio signal through the audio output unit 226.

Referring to FIG. 5B, the image display apparatus 200 may provide an interface configured to receive an input for selecting, from the screen image 500 displayed on the display unit 201, a region where a text is extracted to be converted into an audio signal. A user may drag one region from the screen of the display unit 201, and the display unit 201 may detect the dragged region by using a touch sensor. The controller 212 may select the detected region 510, and may execute an optical character recognition function with respect to the region selected from the screen image, thereby extracting a text.

Second Embodiment

Figure 6:
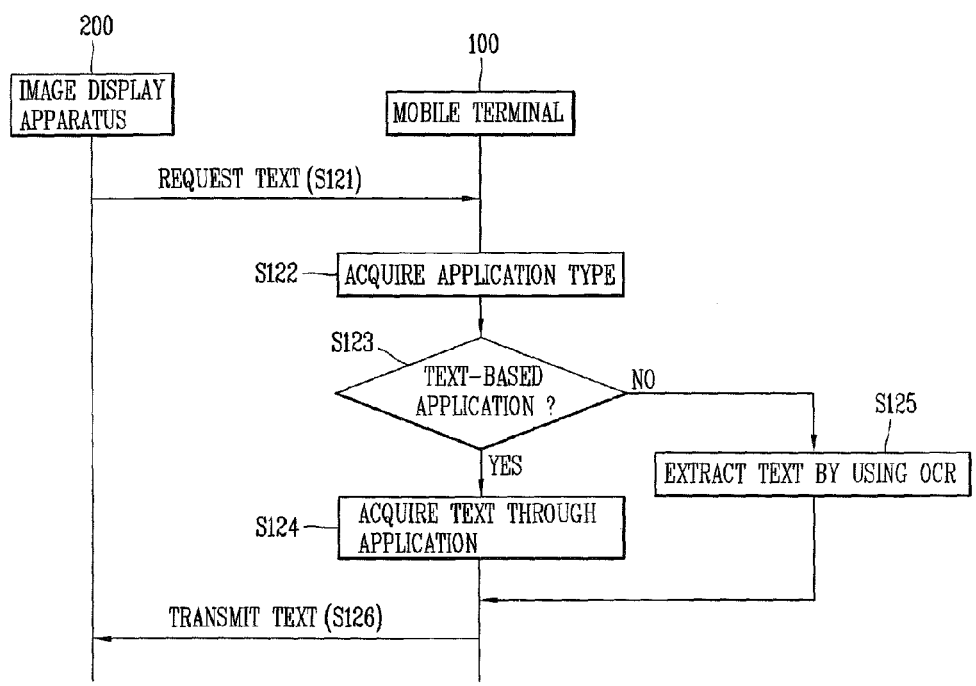
FIG. 6 is a flowchart illustrating a text acquiring step (S120) of FIG. 4 according to the first embodiment of the present invention.

FIG. 6 is a flowchart illustrating a text acquiring step (S120) of FIG. 4. The process of FIG. 6 may be performed by the devices shown in FIGS. 1-3.

The controller 212 may request a text corresponding to an image received from the mobile terminal 100, from the mobile terminal (S121).

Then, the controller 180 of the mobile terminal 100 may acquire an application type corresponding to the received image according to the request (S122).

The controller 180 may then determine whether or note the acquired application type is text-based (S123).

If the acquired application type is text-based, the controller 180 may acquire a text corresponding to the received image from the memory 160 through the application (S124).

If the acquired application type is not text-based, the controller 180 may perform an optical character recognition function with respect to the received image thereby to acquire a text (S125).

The wireless communication unit 110 may transmit the acquired text to the image display apparatus 200 (S156).

Figure 7B:
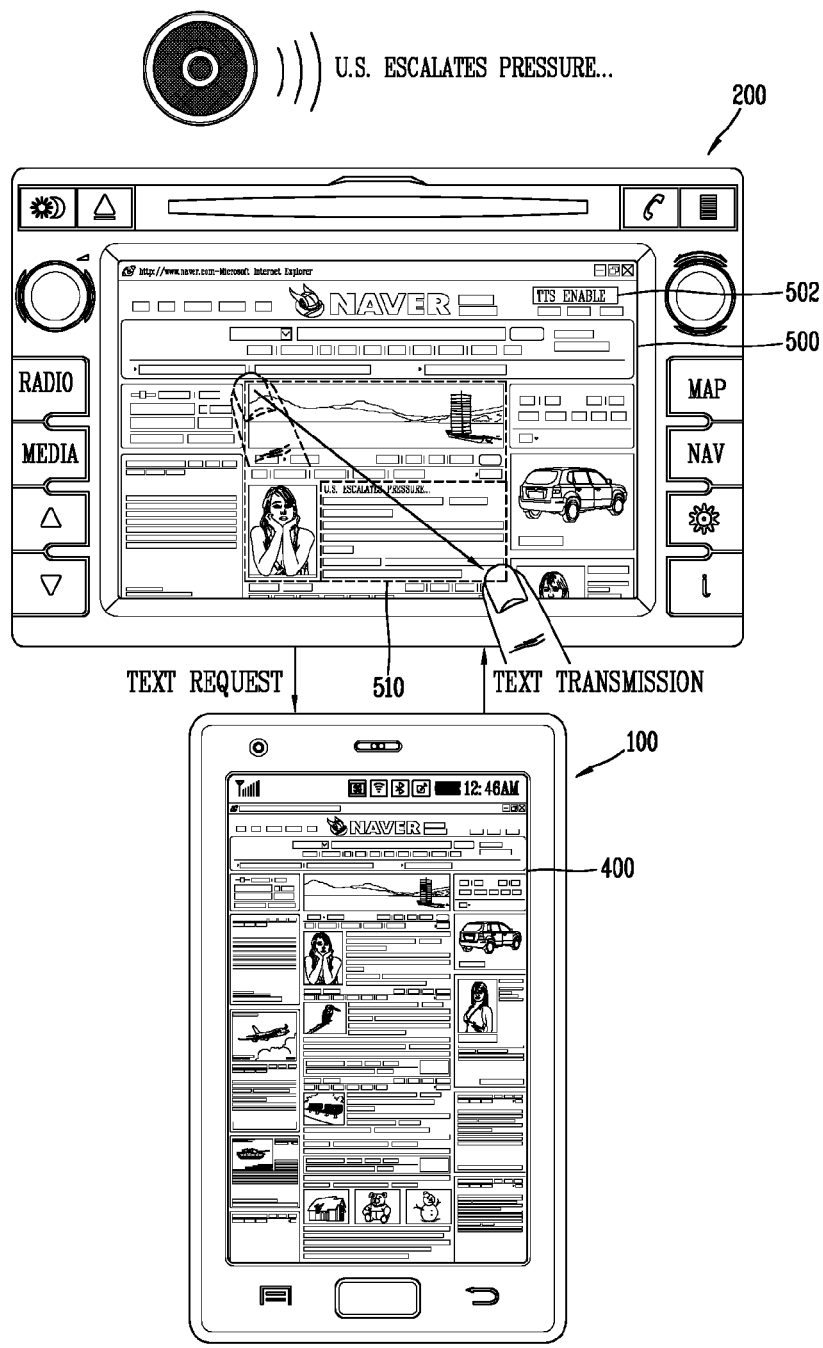

FIGS. 7A and 7B are exemplary views illustrating processes for controlling an operation of an image display apparatus according to a second embodiment of the present invention.

Referring to FIG. 7A, the interface unit 230 may receive a screen image from the mobile terminal 100. For instance, the interface unit 230 may receive a frame buffer corresponding to a screen image from the mobile terminal 100, and the display unit 201 may display each pixel on a corresponding position on a screen according to the received frame buffer. In this case, the mobile terminal 100 may display or may not display the screen image 400 on the screen thereof according to a configuration.

The interface unit 230 may request a text corresponding to the screen image from the mobile terminal 100, and may receive the requested text from the mobile terminal 100.

The controller 212 may determine a vehicle speed, and may compare the determined vehicle speed with a threshold speed. If the determined vehicle speed exceeds the threshold speed, the controller 212 may enter a TTS (Text To Speech) mode. In this case, the display unit 201 may display an indicator 502 indicating that the image display apparatus 200 is in a TTS mode.

Once the image display apparatus 200 has entered the TTS mode, the controller 212 may convert the received text into an audio signal by using a TTS (Text To Speech) engine, and output the audio signal through the audio output unit 226.

Referring to FIG. 7B, the image display apparatus 200 may provide an interface configured to receive an input for selecting, from a screen image 500 displayed on a screen of the display unit 201, a region where a text is extracted to be converted into an audio signal. A user may drag one region from the screen of the display unit 201, and the display unit 201 may detect the dragged region by using a touch sensor. The interface unit 230 request a text corresponding to the dragged region (in this case, the interface unit 230 transmits information on the dragged region to the mobile terminal 100) and receives the requested text from the mobile terminal 100.

Third Embodiment

Figure 8:
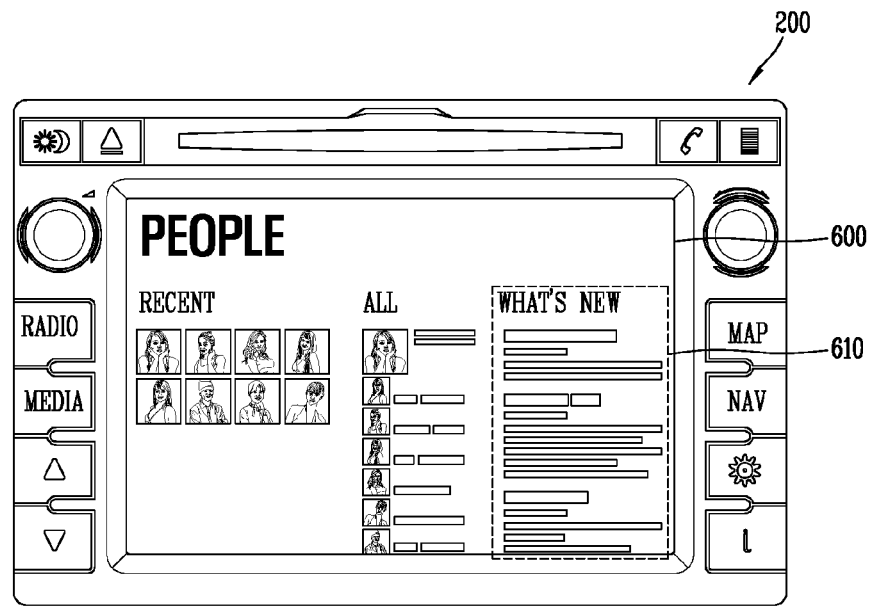
FIG. 8 is an exemplary view illustrating a process for selecting a region from a screen image, the region where a text is extracted to be converted into an audio signal according to a third embodiment of the present invention.

FIG. 8 is an exemplary view illustrating a process for selecting a region from a screen image, the region where a text is extracted to be converted into an audio signal according to a third embodiment of the present invention. The process of FIG. 8 may be performed by the devices shown in FIGS. 1-3.

The display unit 201 may display an image 600 received from the mobile terminal 100 by the interface unit 230. A user may drag one part from a region where the image 600 has been displayed on the display unit 201, and the display unit 201 may detect the dragged region 610 by using a touch sensor. The controller 212 may acquire a text from the detected region 610, and may convert the acquired text into an audio signal to output the audio signal.

Fourth Embodiment

Figure 9A:
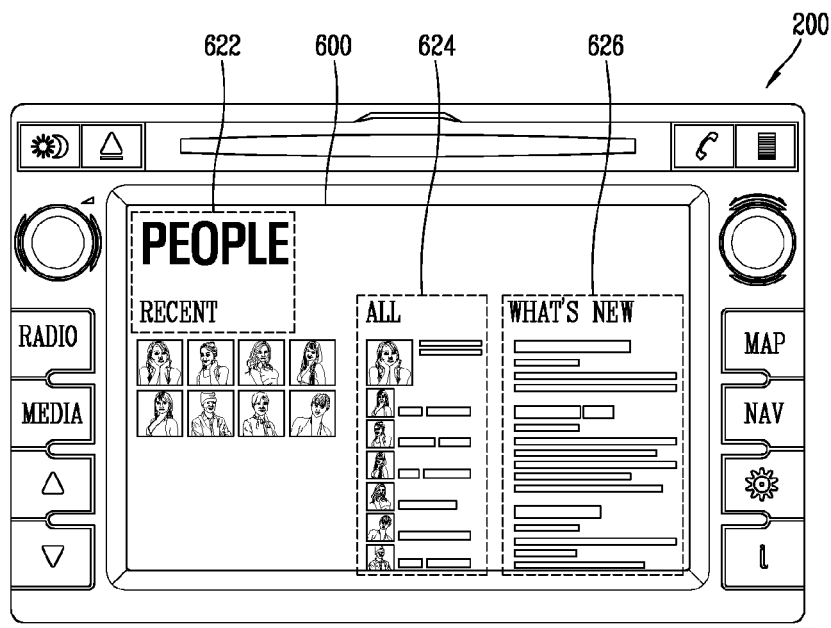
FIGS. 9A and 9B are exemplary views illustrating a process for selecting a region from a screen image, the region where a text is extracted to be converted into an audio signal according to a fourth embodiment of the present invention.
Figure 9B:
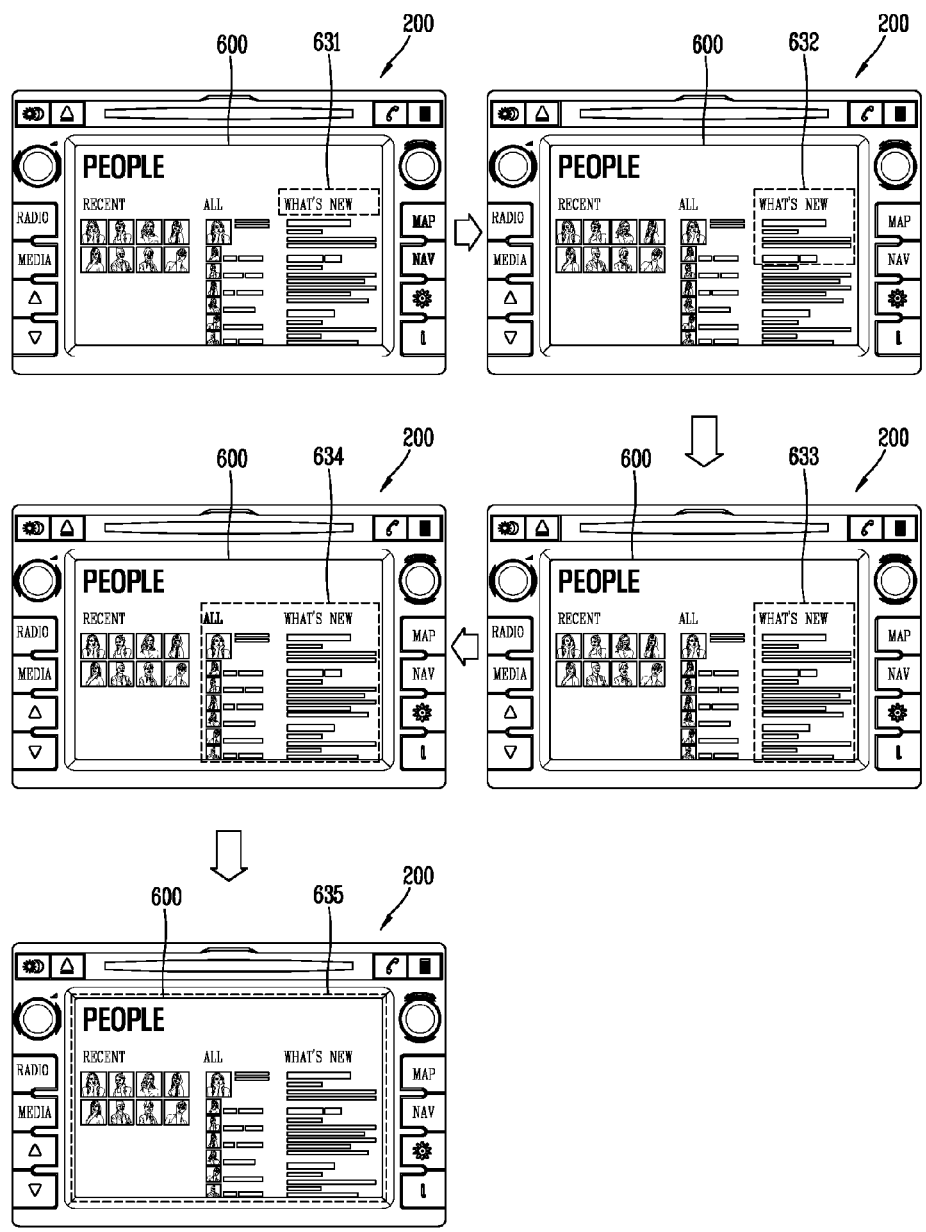

FIGS. 9A-9B are exemplary views illustrating a process for selecting a region from a screen image, the region where a text is extracted to be converted into an audio signal according to a fourth embodiment of the present invention. The process of FIGS. 9A-9B may be performed by the devices shown in FIGS. 1-3.

As seen in FIG. 9A, display unit 201 may display an image 600 received from the mobile terminal 100 by the interface unit 230. The controller 212 may extract a plurality of blocks by processing the image 600 displayed on the display unit 201. For instance, the controller 212 may extract blocks having similar patterns from the image displayed on the display unit 201 by using an image pattern recognition algorithm. Each of the blocks may include one or more texts.

The controller 212 may extract three blocks 622, 624 and 626 from the image 600 displayed on the display unit 201. Based on positions displayed on the display unit 201, the controller 212 may determine priorities of the respective blocks. For instance, the block 622 may have a highest priority since it is displayed at the uppermost side among the three blocks 622, 624 and 626. And, the block 624 may have a next-highest priority since it is displayed at a left side of the block 626. Consequently, the block 622 is provided with a first priority, the block 624 is provided with a second priority and the block 626 is provided with a third priority.

The controller 212 may extract text from the blocks according to the priorities, and may convert the extracted text into audio signals to output the audio signals. For instance, the controller 212 firstly extracts a text from the block 622, and converts the extracted text into an audio signal to output the audio signal. Next, the controller 212 extracts a text from the block 624, and converts the extracted text into an audio signal to output the audio signal. Finally, the controller 212 extracts a text from the block 626, and converts the extracted text into an audio signal to output the audio signal.

While the text extracted from the block 622 is converted into an audio signal to be output, if an input for selecting the next block by a user (e.g., utterance of 'next' through a voice, or selection of a 'next' key on the front board 202, or selection of a 'next' menu on the display unit 201) is received, the controller 212 stops converting the text extracted from the block 622 into an audio signal and outputting the audio signal. Then, the controller 212 extracts a text from the next block 624, and converts the extracted text into an audio signal to output the audio signal.

While the text extracted from the block 624 is converted into an audio signal to be output, if an input for selecting the previous block by a user (e.g., utterance of 'previous' through a voice, or selection of a 'previous' key on the front board 202, or selection of a 'previous' menu on the display unit 201) is received, the controller 212 stops converting the text extracted from the block 624 into an audio signal and outputting the audio signal. Then, the controller 212 extracts a text from the previous block 622, and converts the extracted text into an audio signal to output the audio signal.

FIG. 9B is an exemplary view illustrating a process for selecting a region from a screen image, the region where a text is extracted to be converted into an audio signal according to the fourth embodiment of the present invention.

The display unit 201 may display an image 600 received from the mobile terminal 100 by the interface unit 230. A user may drag one part (e.g., region 631) from a region where the image 600 has been displayed on the display unit 201, and the display unit 201 may detect the dragged region 631 by using a touch sensor. The controller 212 may extract a text from the detected region 631, and may set the detected region 631 as a region where a text is extracted to be converted into an audio signal.

If an input for extending a region by a user (e.g., utterance of 'next' through a voice, or selection of a 'next' key on the front board 202, or selection of a 'next' menu on the display unit 201) is received, the controller 212 sets, by using an image pattern recognition algorithm, a second region 632 as a region where a text is extracted to be converted into an audio signal. The second region 632 is adjacent to the first detected region 631, and further includes an area having a similar pattern to the first detected region 631.

If an input for extending second region 632 is received from the user, the controller 212 sets, by using an image pattern recognition algorithm, a third region 633 as a region where a text is extracted to be converted into an audio signal.

The third region 633 is adjacent to the second region 632, and further includes an area having a similar pattern to the second region 632.

By the aforementioned method, the region 631 may be sequentially set as regions 632, 633, 634 and 635 in an extended manner, the regions where texts are extracted to be converted into audio signals. If an audio signal output command (e.g., utterance of 'output an audio signal' through a voice, or selection of an 'audio signal output' key on the front board 202, or selection of an 'audio signal output' menu on the display unit 201, or when a command for extending a region is not input within a predetermined time) is received from the user, the controller 212 extracts a text from a set region. Then, the controller 212 converts the extracted text into an audio signal to output the audio signal.

Fifth Embodiment

Figure 10A:
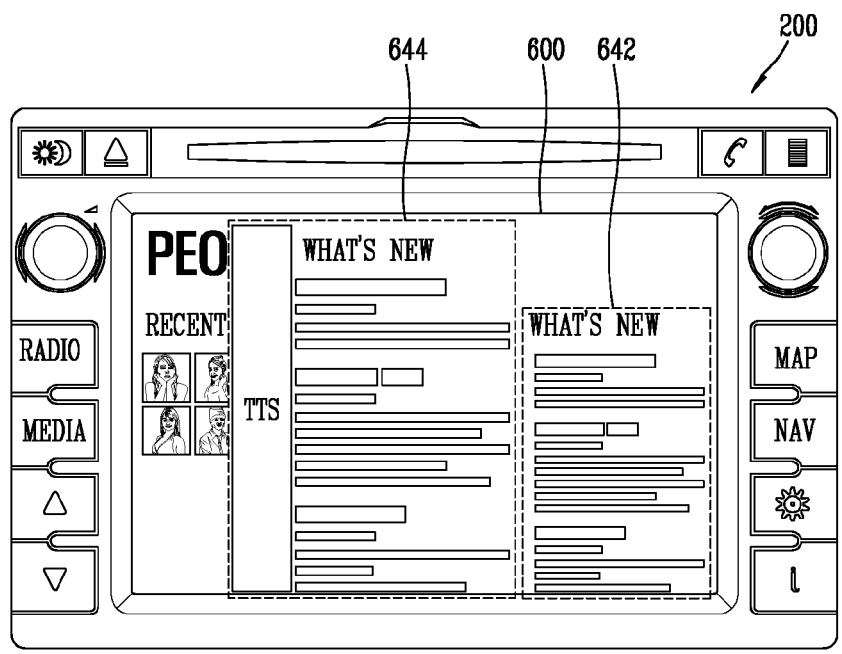
FIGS. 10A and 10B are exemplary views illustrating a process for selecting a region from a screen image, the region where a text is extracted to be converted into an audio signal according to a fifth embodiment of the present invention.
Figure 10B:
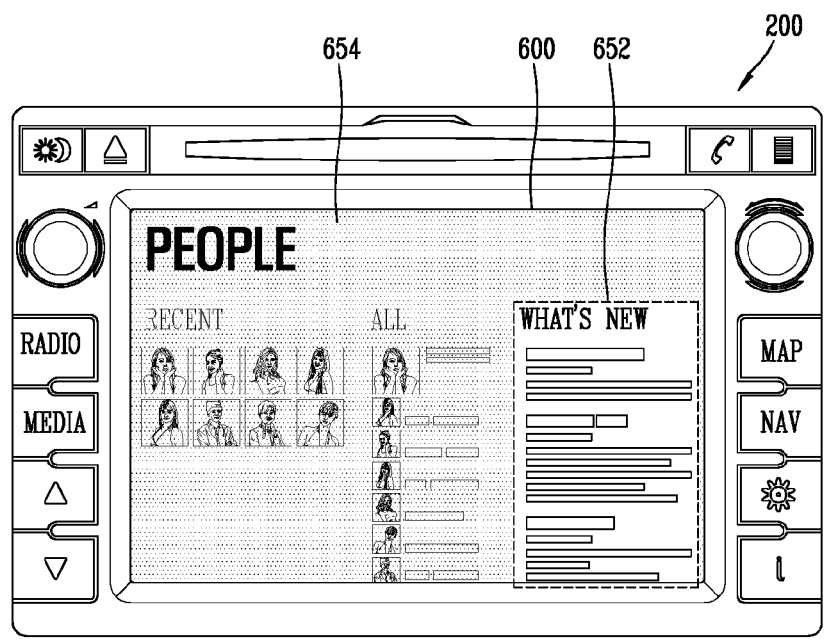

FIGS. 10A and 10B are exemplary views illustrating a process for selecting a region from a screen image, the region where a text is extracted to be converted into an audio signal according to a fifth embodiment of the present invention. The process of FIGS. 10A-10B may be performed by the devices shown in FIGS. 1-3.

The controller 212 may extract a text from the screen image 600, and the display unit 201 may display a region where the extracted text is converted into an audio signal to be output, in a distinguished manner from other regions. For instance, the controller 212 may extract a text, and the display unit 201 may display a region where the extracted text is converted into an audio signal to be output with an animation effect.

Referring to FIG. 10A, the controller 212 may extract a text from a region 642. And, the display unit 201 may enlarge the region 642 where the extracted text is converted into an audio signal to be output, and may display an enlarged region 644 at a center portion of a screen.

Referring to FIG. 10B, the controller 212 may extract a text. And, the display unit 201 may display a region 652 where the extracted text is converted into an audio signal in a highlighted manner.

Sixth Embodiment

Figure 11A:
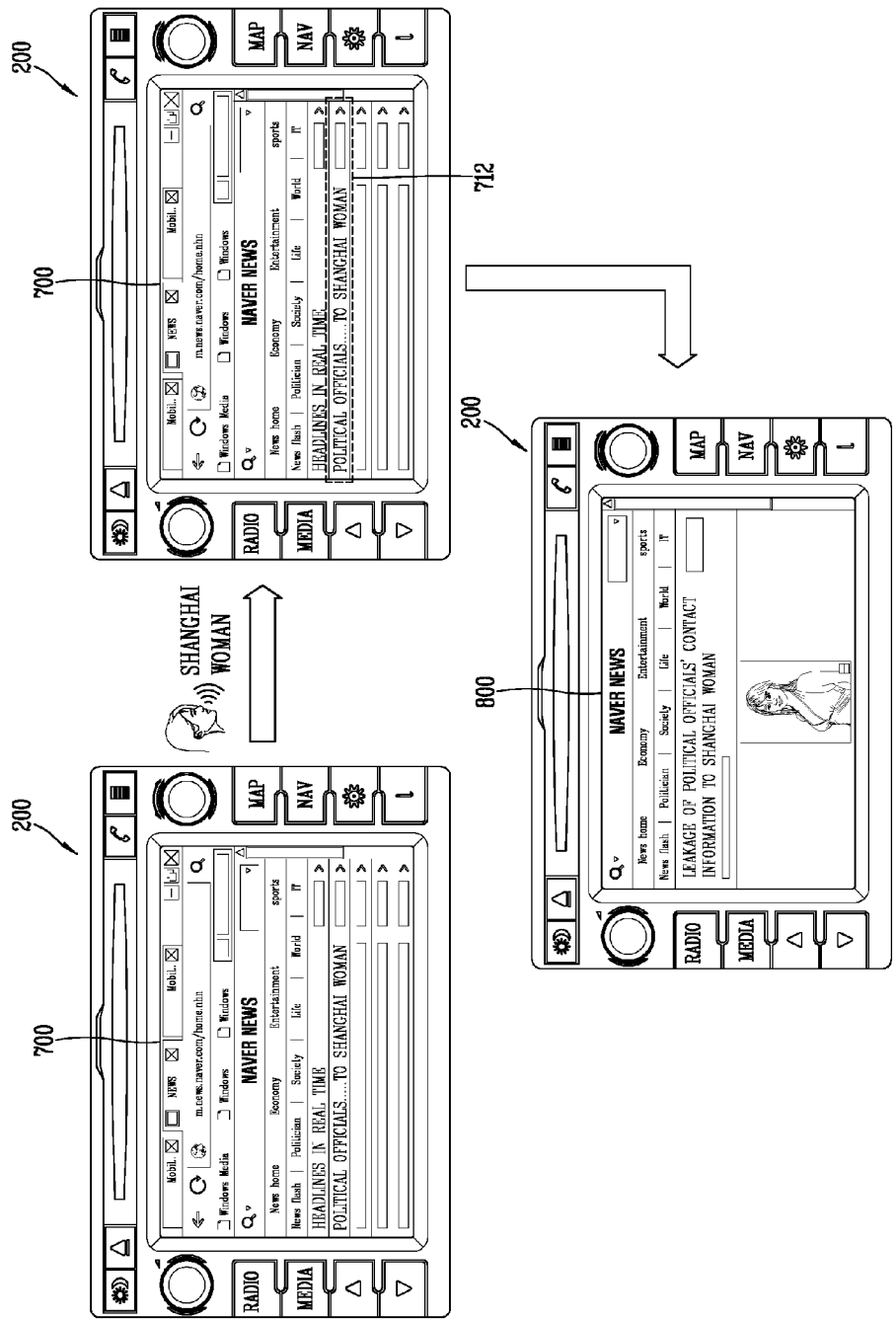
FIGS. 11A and 11B are exemplary views illustrating processes for controlling objects in processes of converting a text extracted from a screen image into an audio signal and outputting the audio signal according to a sixth embodiment of the present invention.
Figure 11B:
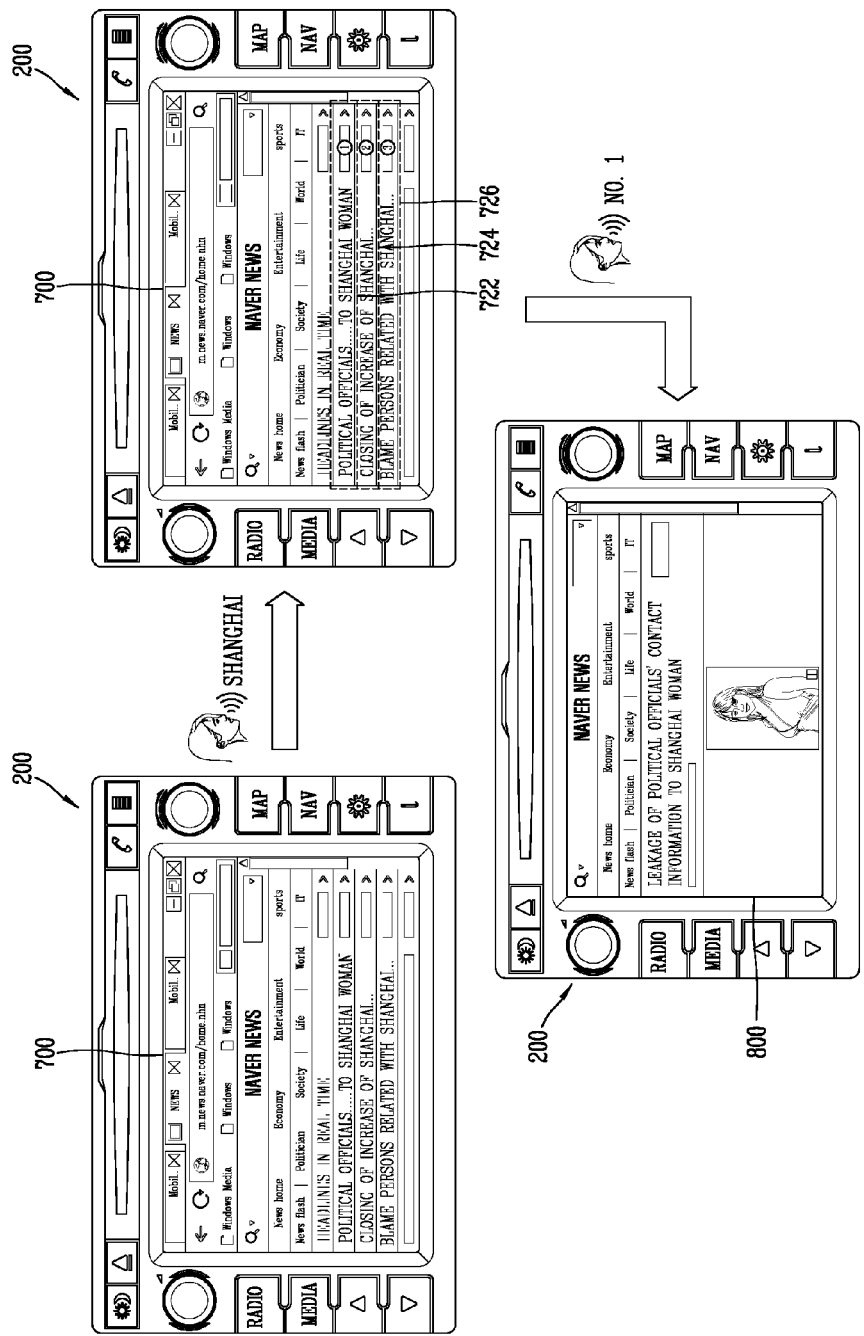

FIGS. 11A and 11B are exemplary views illustrating processes for controlling objects in processes of converting a text extracted from a screen image into an audio signal and outputting the audio signal according to a sixth embodiment of the present invention. The process of FIGS. 11A-11B may be performed by the devices shown in FIGS. 1-3.

Referring to FIG. 11A, the display unit 201 may display an image 700 received from the mobile terminal 100 by the interface unit 230. The controller 212 may extract a text from the displayed image 700, and may convert the extracted text into an audio signal to output the audio signal. Here, the controller 212 may receive a user's input for selecting a text object from the displayed image 700 (e.g., via an utterance of a text (e.g., "Shanghai woman") included in a text object).

In this case, the controller 212 converts the audio signal (i.e., the user's utterance) into a text by using an STT (Speech To Text) engine, etc. Then, the controller 212 searches for the converted text from the text extracted from the displayed image 700. And, the controller 212 generates a control event at a point corresponding to a text object including the searched text.

In this case, the text object 712 including the searched text may be displayed, on the image 700 displayed on the display unit 201, in a distinguished manner from other graphic object.

The interface unit 230 converts the generated control event into a signal to transmit to the mobile terminal 100, and the mobile terminal 100 performs a text object-related operation based on the signal received from the interface unit 230. Once the operation is performed, the interface unit 230 receives a screen image 800 of the mobile terminal 100. And, the display unit 201 displays the screen image 800 received by the interface unit 230.

Referring to FIG. 11B, the display unit 201 may display the image 700 received from the mobile terminal 100 by the interface unit 230. The controller 212 may extract a text from the displayed image 700, and may convert the extracted text into an audio signal to output the audio signal. Here, the controller 212 may receive a user's input for selecting a text object from the displayed image 700 (e.g., an utterance of a text (e.g., "Shanghai") included in a text object).

In this case, the controller 212 converts the audio signal (e.g., the user's utterance) into a text by using an STT (Speech To Text) engine, etc. Then, the controller 212 searches for the converted text from the text extracted from the displayed image 700. When there is a plurality of objects resulting from the search, the display unit 201 may display the plurality of objects 722, 724 and 726 in a distinguished manner from other objects on the displayed image 700, and may display the respective objects 722, 724 and 726 in a distinguished manner from each other. In this case, the display unit 201 may display indicators (①, ② and ③) in an associated manner with the respective objects 722, 724 and 726 such that the respective objects 722, 724 and 726 are distinguished from one another. Here, the indicators may be numbers or characters, etc. which can be selected through a user's voice or a user's touch or other input.

The controller 212 may receive a user's input for selecting one of the plurality of objects. For instance, a user may utter "No. 1" or may touch a position corresponding to "No. 1" on the display unit 201.

The controller 212 generates a control event at a point corresponding to the selected text object. The interface unit 230 converts the generated control event into a signal to transmit to the mobile terminal 100, and the mobile terminal 100 performs a text object-related operation based on the signal received from the interface unit 230. Once the operation is performed, the interface unit 230 receives the screen image 800 of the mobile terminal 100. And, the display unit 201 displays the screen image 800 received by the interface unit 230.

Seventh Embodiment

Figure 12:
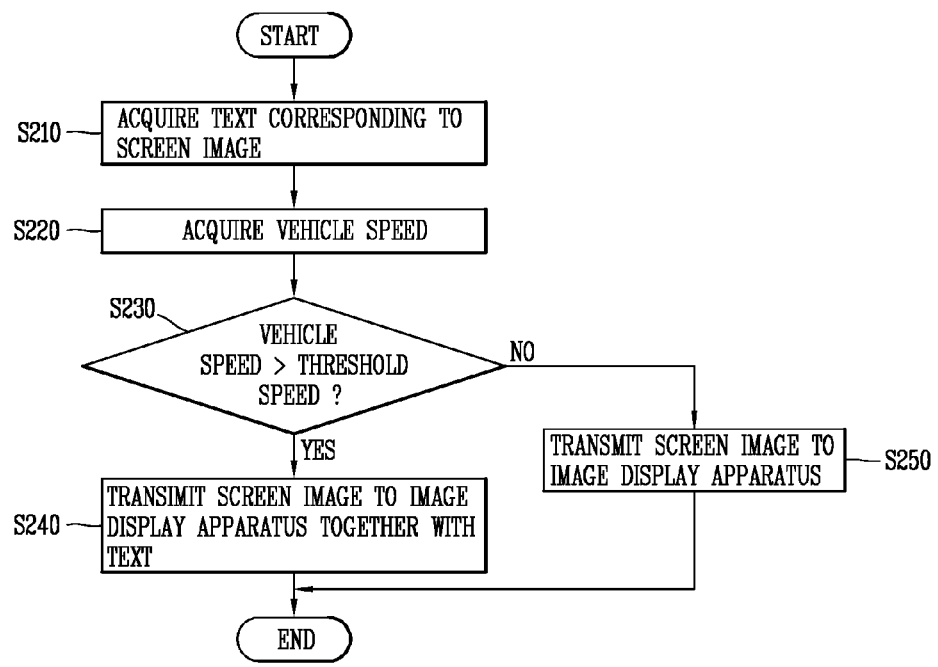
FIG. 12 is a flowchart illustrating processes for controlling an operation of a mobile terminal according to a seventh embodiment of the present invention.

FIG. 12 is a flowchart illustrating processes for controlling an operation of a mobile terminal according to a seventh embodiment of the present invention. The method of FIG. 12 may be performed by the devices shown in FIGS. 1-3.

The controller 180 acquires a text corresponding to a screen image (S210).

For instance, the controller 180 may determine whether an application corresponding to a screen image is a text-based application such as a web browser and an E-book. If it is determined that the application is a text-based application, the controller 180 may acquire a text from data stored in the memory 160 at a region accessible by an application. Alternatively, if it is determined that the application is not a text-based application, the controller 180 may execute an optical character recognition function with respect to the screen image, thereby extracting a text from the screen image.

The controller 180 acquires a vehicle speed (S220). For instance, the position information module 115 may acquire GPS information of the mobile terminal, and the controller 180 may directly calculate a vehicle speed from position changes of the vehicle according to time.

The wireless communication unit 110 may receive a vehicle speed from the image display apparatus 220. In this case, the speed sensor 225c calculates a vehicle speed, and the calculated vehicle speed is provided to the controller 212. Alternatively, the GPS module 207 may acquire position information of a vehicle, and the controller 212 may directly calculate a vehicle speed from position changes of the vehicle according to time based on the acquired position information of the vehicle. The controller 212 may provide the acquired vehicle speed, to the controller 180, through the interface unit 230.

The controller 180 compares the calculated vehicle speed with a threshold speed (S230).

If the calculated vehicle speed exceeds a threshold speed stored in the memory 160 (e.g., 0 mile/h, or travel speed restricted by law such as 5 m/h) in S230, the wireless communication unit 110 transmits the screen image to the image display apparatus 200 together with the text (S240).

On the other hand, if the calculated vehicle speed does not exceed the threshold speed stored in the memory 160 in S230, the wireless communication unit 110 transmits the screen image to the image display apparatus 200 (S250).

The display unit 201 of the image display apparatus 200 displays the screen image received from the mobile terminal 100. The controller 212 converts a text received from the mobile terminal 100 into an audio signal by using a TTS (Text To Speech) engine, etc. And, the audio output unit 226 outputs the converted audio signal through a speaker, a Bluetooth headset, etc.

The image display apparatus of various embodiments of the present invention provides an interface for visually or audibly checking information included in an image provided from the mobile terminal according to a vehicle speed. In the mobile terminal and the image display apparatus according to the present invention, a user may stably and conveniently check information included in an image provided from the mobile terminal through the image display apparatus while driving a vehicle.

The method for controlling an operation of the image display apparatus according to various embodiments of the present invention may be implemented as a program code stored in a computer-readable storage medium provided at the image display apparatus 200. The storage medium may include ROM, RAM, CD-ROM, a magnetic tape, a floppy disc, an optical data storage device, etc. Alternatively, the computer-readable storage medium may be distributed to a computer system connected to a network, and a program code may be stored and executed in a distributed manner.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An image display apparatus configured to be installed in a vehicle, the image display apparatus, comprising:
 a communication unit configured to receive an image from a mobile terminal;
 a display unit configured to display the received image;
 an audio output unit;
 a controller operatively connected to the communication unit, the display unit and the audio output unit, the controller configured to:
 acquire text from the displayed image;
 acquire a vehicle speed;
 convert the acquired text into an audio signal when the acquired vehicle speed exceeds a threshold speed; and
 output sound corresponding to the audio signal via the audio output unit in a state where the received image is displayed on the display unit.

2. The image display apparatus of claim 1, wherein the control unit is configured to display, based on information received from the mobile terminal, an indication that the text corresponding to the displayed image is available for conversion to the audio signal.

3. The image display apparatus of claim 2, wherein the control unit is configured to acquire the text from the mobile terminal in response to a user input to the indication.

4. The image display apparatus of claim 3, wherein the user input is one of a touch input to the display unit and a voice command.

5. The image display apparatus of claim 1, wherein the controller is configured to display an indication that the text corresponding to the displayed image can be output as the audio signal when the acquired speed exceeds a threshold speed.

6. The image display apparatus of claim 1, wherein the controller is configured to perform an optical character recognition function on a portion of the displayed image to acquire the text.

7. The image display apparatus of claim 1, wherein the controller is configured to acquire the text corresponding to the displayed image in response to a user selection of an audio output region from the displayed image.

8. The image display apparatus of claim 7, further comprising:
 an input unit operatively connected to the controller and configured to receive an input for selecting the audio output region from the displayed image.

9. The image display apparatus of claim 7, wherein the controller is configured to detect a plurality of text regions from the displayed image, and to select a first region of the plurality of text regions as the audio output region based on a predetermined criteria.

10. The image display apparatus of claim 9, wherein, after selecting the first region as the audio output region, the controller is configured to select a second region of the plurality of text regions different from the first region as a second audio output region.

11. The image display apparatus of claim 7, wherein the controller is configured to display the audio output region selected from the displayed image in a manner that distinguishes the audio output region from other regions of the image displayed on the display unit.

12. A method of controlling an image display apparatus installed in a vehicle, the method comprising:
 receiving an image from a mobile terminal;
 displaying the image;
 acquiring text corresponding to the displayed image;
 acquiring a vehicle speed;
 converting the acquired text into an audio signal when the acquired vehicle speed exceeds a threshold speed; and
 outputting sound corresponding to the audio signal in a state where the received image is displayed on a display unit of the image display apparatus.

13. The method of claim 12, further comprising:
 displaying an indication that the text corresponding to the displayed image is available for conversion to the audio signal.

14. The method of claim 13, wherein the step of acquiring the text corresponding to the displayed image comprises:
 acquiring the text from the mobile terminal in response to a user input to the indication, wherein the user input is one of a touch input to the image display apparatus and a voice command.

15. The method of claim 12, wherein the step of acquiring the text corresponding to the displayed image comprises:
 performing an optical character recognition function on a portion of the displayed image.

16. The method of claim 12, wherein the step of acquiring the text corresponding to the displayed image comprises:
 acquiring the text in response to a user selection of an audio output region from the displayed image.

17. A mobile terminal, comprising:
 a communication unit;
 a controller operatively connected to the communication unit and configured to:
 transmit an image to an image display device installed in a vehicle;
 acquire a speed of the vehicle; and
 when the speed exceeds a threshold speed, transmit a text file to the image display device, the text file corresponding to a portion of the image; and
 a display unit to display the image,
 wherein the image is simultaneously displayed on the display unit and the image display device installed in the vehicle.

18. The mobile terminal of claim 17, wherein the text file includes one of audio data and text data that is convertible into the audio data.

19. The mobile terminal of claim 17, wherein the controller is configured to transmit an indication to the image display device that one of audio data and text data that is convertible into audio data is available for transmission to the image display device.

20. The mobile terminal of claim 17, wherein the controller is configured to perform an optical character reading function on the portion of the image to generate the audio data as the text file.

* * * * *